United States Patent [19]
Fuerst et al.

[11] 3,910,951
[45] Oct. 7, 1975

[54] MANUFACTURE OF SUCCINIMIDE

[75] Inventors: Ernst Fuerst, Neustadt; Siegfried Winderl, Heidelberg-Wieblingen; Arnold Wittwer, Ludwigshafen; Herwig Hoffmann, Frankenthal, all of Germany

[73] Assignee: BASF Aktiengesellschaft, Ludwigshafen, Germany

[22] Filed: Mar. 11, 1974

[21] Appl. No.: 450,146

[30] Foreign Application Priority Data
Mar. 17, 1973  Germany.................. 2313386

[52] U.S. Cl.................................. 260/326.5 FM
[51] Int. Cl.² .............................. C07D 207/32

[58] Field of Search ................... 260/326.5 FM

[56] References Cited
UNITED STATES PATENTS
3,431,276  3/1969  Nield .................. 260/326.5

Primary Examiner—Donald G. Daus
Assistant Examiner—Mark L. Berch
Attorney, Agent, or Firm—Johnston, Keil, Thompson & Shurtleff

[57] ABSTRACT

Manufacture of succinimide from succinic acid and aqueous ammonia in the presence of small amounts of tertiary ammonium phosphate.

3 Claims, No Drawings

MANUFACTURE OF SUCCINIMIDE

This invention relates to a process for the manufacture of very pure succinimide by reacting succinic acid with aqueous ammonia solution in the presence of tertiary ammonium phosphate at a temperature of from 250° to 255°C.

In the manufacture of succinimide from succinic acid under the action of aqueous ammonia solution with heating, the by-products succinic mono-amide and succinic anhydride are formed which contaminate the desired succinimide. In particular, when molar amounts of succinic acid and ammonia solution are reacted with each other, the yield is only about 86% by weight of succinimide having a melting point of only 117°C, as compared with the best melting point known of 126°C. Even when the proportion of ammonia solution is increased to 1.5 moles and more for 1 mole of succinic acid in the reaction mixture, the succinimide produced has a melting point of only 123° to 124°C. Another measure of the purity of this product is its acid number. The acid number of products manufactured in known manner is from 40 to 45 [mg KOH/g]. Neither is it possible to produce purer succinimide in this way by varying the reaction conditions such as the concentration of the reactants or the temperature.

It is an object of the invention to produce succinimide showing very high purity.

We have found that this object is achieved by reacting succinic acid and aqueous ammonia solution, which may, if desired, be used in an excess of up to 1.5 moles, with virtually quantitative conversion, if minor quantities, e.g. from 0.5 to 1.5% by weight based on succinic acid, or tertiary ammonium phosphate are added to the reaction mixture. Addition of more than a minor quantity of the said compound does not normally have an adverse influence on the process.

Particularly good results are obtained when the reaction is carried out at a temperature of from about 250° to 255°C. Below this temperature range, ring formation is not quite complete, and above temperatures of from 255° to 260°C the succinimide formed may begin to disintegrate.

Using the improved process of the invention and following distillation of the crude products under reduced pressure, succinimide is obtained having a melting point of at least 125°C and an acid number of about 32 [mg KOH/g].

EXAMPLE 118 g (1 mole) of succinic acid are placed in a stirred vessel together with 1.2 g of tertiary ammonium phosphate. 115 g of 25% aqueous ammonia solution (1.5 moles of $NH_3$) are slowly added over 10 minutes. The temperature rises gradually to 70°C. There is produced a readily stirrable salt solution which is stirred for a further hour without the application of heat. The reaction mixture is then gradually heated to 250°C at atmospheric pressure, stirring being continued. During this process the water and excess ammonia distill off. When a bottoms temperature of from 250° to 255°C has been reached, heating is continued until no more water distills over.

The crude product obtained is then vacuum distilled. The major portion distills over as a colorless liquid at 124°C/5 mm. The liquid solidifies on cooling to give pure succinimide having a melting point of 25°C; yield 97%.

The acid number of the pure product is 32 [mg KOH/g].

We claim:

1. In a process for the manufacture of succinimide by reacting succinic acid with aqueous ammonia solution at a temperature of about 250° to 260°C, the improvement which comprises carrying out the reaction in the presence of an effective minor quantity of tertiary ammonium phosphate.

2. A process as set forth in claim 1, wherein the reaction is carried out in the presence of from about 0.5 to 1.5% by weight of tertiary ammonium phosphate based on succinic acid.

3. A process as set forth in claim 1, wherein the reaction is carried out at a temperature of from approximately 250° to 255°C.

* * * * *